United States Patent
Wu et al.

(10) Patent No.: US 11,945,481 B2
(45) Date of Patent: Apr. 2, 2024

(54) METHOD AND APPARATUS FOR TRACKING AND CONTROLLING VIRTUAL MARSHALLING TRAINS, ELECTRONIC DEVICE, AND READABLE STORAGE MEDIUM

(71) Applicant: Traffic Control Technology Co., Ltd, Beijing (CN)

(72) Inventors: Mengwei Wu, Beijing (CN); Lei Zhang, Beijing (CN); Feng Bao, Beijing (CN)

(73) Assignee: Traffic Control Technology Co., Ltd, Beijing (CN)

( * ) Notice: Subject to any disclaimer, the term of this patent is extended or adjusted under 35 U.S.C. 154(b) by 287 days.

(21) Appl. No.: 17/563,083

(22) Filed: Dec. 28, 2021

(65) Prior Publication Data
US 2023/0013788 A1    Jan. 19, 2023

(30) Foreign Application Priority Data
Jul. 13, 2021 (CN) .......................... 202110791290.6

(51) Int. Cl.
*B61L 25/02* (2006.01)
*G06N 20/00* (2019.01)

(52) U.S. Cl.
CPC ........... *B61L 25/028* (2013.01); *B61L 25/021* (2013.01); *G06N 20/00* (2019.01)

(58) Field of Classification Search
CPC ...... B61L 25/021; B61L 25/028; B61L 27/04; B61L 27/14; B61L 27/16; G06N 20/00
See application file for complete search history.

(56) References Cited

U.S. PATENT DOCUMENTS 7,222,083 B2 * 5/2007 Matheson ............... B61L 27/16
    706/45
7,539,624 B2 * 5/2009 Matheson ........ G06Q 10/06314
    701/19
(Continued)

FOREIGN PATENT DOCUMENTS

CN        107685749 A      2/2018
CN        108154464 A      6/2018
(Continued)

OTHER PUBLICATIONS

The extended European search report for European Application No. 21218259.6, dated Jul. 12, 2022, 6 pages.
(Continued)

*Primary Examiner* — Phutthiwat Wongwian
*Assistant Examiner* — Anthony L Bacon
(74) *Attorney, Agent, or Firm* — East IP P.C.

(57) ABSTRACT

The embodiments of the present application provide a method and apparatus for tracking and controlling virtual marshalling trains, an electronic device, and a readable storage medium, which is intended to balance the running safety and the utilization of the railway resources. In the present application, the running state data of the target train is obtained, the target control operation corresponding to the running state data is determined from the plurality of preset control operations based on the preset reinforcement learning model, and the control of the target train is implemented according to the target control operation. In addition, the reward value corresponding to the previous control operation of the target control operation is determined according to the distance contained in the running state data, and the reinforcement learning model is updated according to the reward value.

11 Claims, 5 Drawing Sheets

(56) References Cited

U.S. PATENT DOCUMENTS

2018/0327008 A1* 11/2018 Kindt .................... B61L 23/044
2022/0185350 A1*  6/2022 Kindt ....................... B61L 1/18

FOREIGN PATENT DOCUMENTS

| CN | 112406959 A | 2/2021 |
| CN | 112699569 A | 4/2021 |
| CN | 1130225 95 A | 6/2021 |
| DE | 102011075642 A1 | 11/2012 |
| EP | 3473523 A1 | 4/2019 |

OTHER PUBLICATIONS

Wang, Hongwei et al., A Reinforcement Learning Empowered Cooperative Control Approach forIIoT-Based Virtually Coupled Train Sets, vol. 17, No. 7, Jul. 2021, 11 pages.

The Grant Notification for Chinese Application No. 202110791290. 6, dated Aug. 4, 2022, 6 pages.

\* cited by examiner

METHOD AND APPARATUS FOR TRACKING AND CONTROLLING VIRTUAL MARSHALLING TRAINS, ELECTRONIC DEVICE, AND READABLE STORAGE MEDIUM

CROSS-REFERENCE TO RELATED APPLICATION

This application claims priority to Chinese Patent Application No. 202110791290.6, filed on Jul. 13, 2021, which is hereby incorporated by reference in its entirety.

TECHNICAL FIELD

The present application relates to a technical field of railway traffic, and in particular to a method and apparatus for tracking and controlling virtual marshalling trains, an electronic device, and a readable storage medium.

BACKGROUND

Under a condition that a train control system is used to control and schedule a plurality of trains in running, the running of the trains is usually controlled from a perspective of the arrival times of the trains. Since the interval between the arrival times of different trains is usually relatively long, the running gap between the trains is usually naturally long, and the distance between the trains is usually not too close to cause safety problems. Nevertheless, since the running gap between the trains is too long, railway resources cannot be fully used, thereby making it difficult to further increase the overall capacity of the railway resources.

It can be seen that in related technologies, how to balance the running safety and the utilization of the railway resources is an urgent problem to be solved.

SUMMARY

The embodiments of the present application provide a method and apparatus for tracking and controlling virtual marshalling trains, an electronic device, and a readable storage medium.

According to a first aspect of the embodiments of the present application, a method for tracking and controlling virtual marshalling trains is provided. The method includes: obtaining running state data of a target train, wherein the running state data includes a distance between the target train and a target tracking train, the target train and the target tracking train are located in a same virtual marshalling, and in the virtual marshalling, the target tracking train is a train running in front of the target train and closest to the target train; determining a target control operation corresponding to the running state data from a plurality of preset control operations based on a preset reinforcement learning model, and controlling the target train according to the target control operation; determining a reward value corresponding to a previous control operation of the target control operation according to the distance contained in the running state data; and updating the reinforcement learning model according to the reward value.

According to a second aspect of the embodiments of the present application, an apparatus for tracking and controlling virtual marshalling trains is provided. The apparatus includes: a running state data obtaining module configured to obtain running state data of a target train, wherein the running state data includes a distance between the target train and a target tracking train, the target train and the target tracking train are located in a same virtual marshalling, and in the virtual marshalling, the target tracking train is a train running in front of the target train and closest to the target train; a train control module configured to determine a target control operation corresponding to the running state data from a plurality of preset control operations based on a preset reinforcement learning model, and control the target train according to the target control operation; a reward value determination module configured to determine a reward value corresponding to a previous control operation of the target control operation according to the distance contained in the running state data; and a model update module configured to update the reinforcement learning model according to the reward value.

According to a third aspect of the embodiments of the present application, an electronic device is provided. The electronic device includes a processor, a memory, and a bus, the memory stores machine-readable instructions executable by the processor, the processor communicates with the memory through the bus when the electronic device is operating, and the machine-readable instructions, when executed by the processor, perform the above method for tracking and controlling virtual marshalling trains.

According to a fourth aspect of the embodiments of the present application, a storage medium is provided. The storage medium has computer programs stored thereon, and the computer programs, when executed by a processor, perform the above method for tracking and controlling virtual marshalling trains.

BRIEF DESCRIPTION OF THE DRAWINGS

The drawings illustrated here are used to provide a further understanding of the application and constitute a part of the application. Exemplary embodiments of the application and their descriptions are used to explain the application and do not constitute improper limitations of the application. In the drawings.

DETAILED DESCRIPTION

Figure 1:
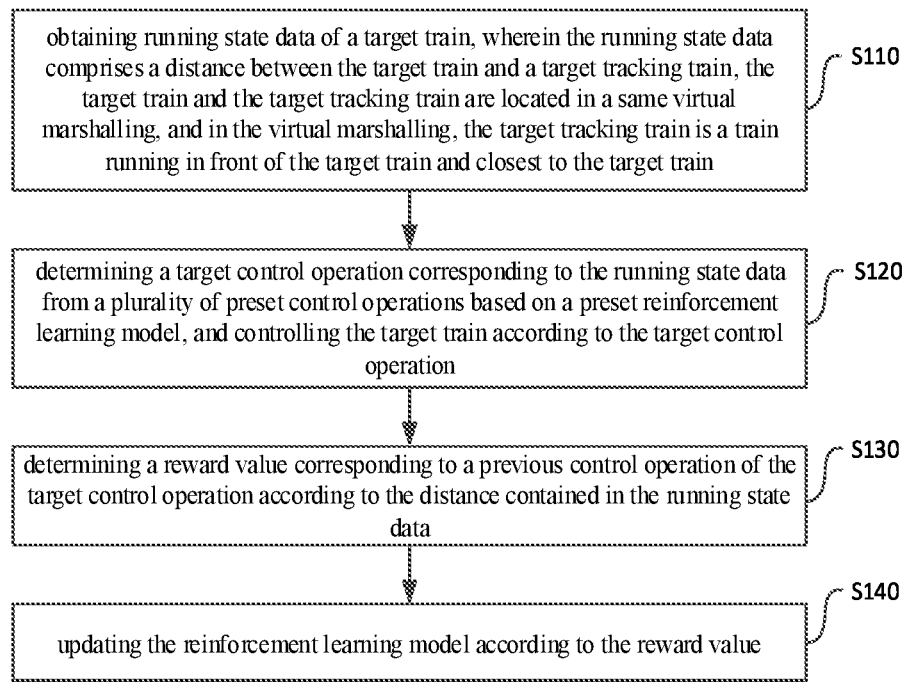
FIG. 1 is a schematic flowchart of a method for tracking and controlling virtual marshalling trains according to an embodiment of the present application.

In the process of implementing the present application, the inventor found that when the traditional CBTC (Communication Based Train Control System) train control system is used to control and schedule the running of a plurality of trains, the running gap between the trains is usually maintained too long. Nevertheless, the excessively long running gap between the trains is at the expense of transportation capacity. When the running gap between the trains is too long, the utilization of the railway resources is correspondingly reduced, resulting in a decrease in the transportation capacity. It can be seen that in related technologies, how to balance the running safety and the utilization of the railway resources is an urgent problem to be solved.

With respect to the above problems, the embodiments of the present application provide a method and apparatus for tracking and controlling virtual marshalling trains, an electronic device, and a readable storage medium. The running state data of the target train is obtained, the target control operation corresponding to the running state data is determined from the plurality of preset control operations based on the preset reinforcement learning model, and the control of the target train is implemented according to the target control operation. In the present application, since the running state data includes the distance between the target train and the target tracking train, the target control operation will be determined by taking the distance as a consideration factor, such that a suitable target control operation may be determined. By performing the target control operation, the distance between the target train and the target tracking train may be adjusted.

In addition, in the present application, the reward value corresponding to the previous control operation of the target control operation is determined according to the distance contained in the running state data, and the reinforcement learning model is updated according to the reward value. In this way, the reinforcement learning model can be continuously optimized during the running of the train, thereby helping to improve the stability of the control of the train.

In order to make technical solutions and advantages of the embodiments of the application clearer, exemplary embodiments of the application will be described in further details below with reference to the accompanying drawings. Obviously, the described embodiments are only a part of the embodiments of the application, and are not exhaustive. It should be noted that the embodiments in the application and features in the embodiments could be combined with each other if there is no conflict.

In the present application, the plurality of trains running on a same railway line can be established into a virtual marshalling, and the plurality of trains in the virtual marshalling are not connected by physical couplers, but wireless communication connections are established. When the virtual marshalling is running in a platform region, each train in the virtual marshalling can control the running of each train according to a preset control mode. The specific control mode of the preset control mode applied in the platform region is not limited in the present application.

Under a condition that the virtual marshalling leaves the platform region and starts to run between the previous platform and the next platform, each train in the virtual marshalling can determine whether it enters a cruise state according to its traction force. Under a condition that the train enters the cruising state, the train can switch from the preset control mode to the method for tracking and controlling virtual marshalling trains provided by the present application. Therefore, the train may be controlled according to the method for tracking and controlling virtual marshalling trains provided by the present application, so that the distance between the train and a train in front of the train (i.e., the target tracking train hereinafter) may be stably controlled within an appropriate range.

Under a condition that the virtual marshalling completes the delivery task, each train in the virtual marshalling receives an unmarshalling instruction. In response to the unmarshalling instruction, each train first switches from the method for tracking and controlling virtual marshalling trains provided by the present application to the preset control mode, and then removes the marshalling state. Here, the unmarshalling instruction can be issued by a train in the virtual marshalling after detecting an unmarshalling operation of the driver, or can be issued by a railway scheduling center, which is not limited in the present application.

For illustration, the present application takes a train in a virtual marshalling as an example, and describes the method for tracking and controlling virtual marshalling trains applied between platforms. Hereinafter, this train may be referred to as a target train.

Referring to FIG. 1, FIG. 1 is a schematic flowchart of a method for tracking and controlling virtual marshalling trains according to an embodiment of the present application. The method for tracking and controlling virtual marshalling trains may be executed by an electronic device or system on the target train, and the electronic device or system can control the running of the target train by executing the method for tracking and controlling virtual marshalling trains. For illustration, the electronic device or system that executes the method for tracking and controlling virtual marshalling trains may be referred to as an execution subject. As shown in FIG. 1, the method for tracking and controlling virtual marshalling trains includes steps S110-S140.

S110: obtaining running state data of a target train, wherein the running state data includes a distance between the target train and a target tracking train, the target train and the target tracking train are located in a same virtual marshalling, and in the virtual marshalling, the target tracking train is a train running in front of the target train and closest to the target train.

In the present application, the execution subject may periodically obtain the running state data of the target train. For example, the execution subject may obtain the current running state data of the target train every 1 second. Each time the execution subject obtains the running state data, it executes the following steps S120 to S140 to periodically control the train and periodically update the following reinforcement learning model.

The running state data of the target train includes the distance between the target train and the target tracking train. In some possible implementations, the distance may be a distance between the front of the target train and the rear of the target tracking train. Alternatively, in some possible implementations, the distance may also be a distance between the midpoint of the target train and the midpoint of the target tracking train. Alternatively, in some possible implementations, the distance may be a distance between the front of the target train and the front of the target tracking train.

In some possible implementations, the distance may be a straight-line distance between the front of the target train and the rear of the target tracking train. Alternatively, in some possible implementations, the distance may be a length of the railway track between the front of the target train and the rear of the target tracking train.

In some possible implementations, the target tracking train can periodically send its own position information to the target train. Whenever the target train receives the position information of the target tracking train, the target train may determine the distance between the target train and the target tracking train based on the position of the target tracking train and the current position of the target train.

Figure 2:
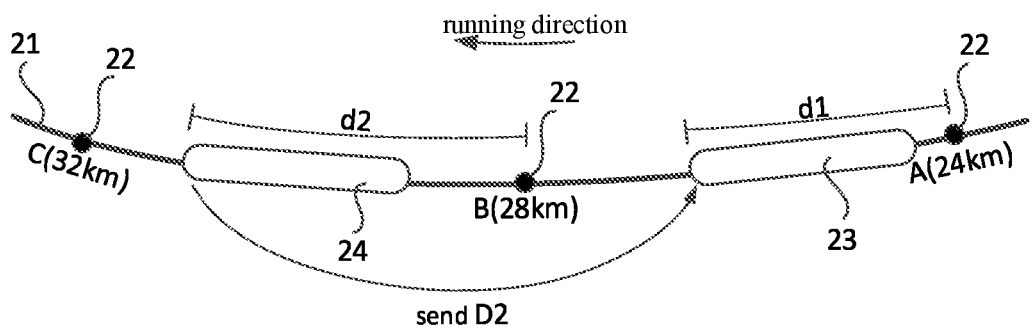
FIG. 2 is a schematic diagram of running of train according to an embodiment of the present application.

For a specific implementation, referring to FIG. 2, FIG. 2 is a schematic diagram of running of train according to an embodiment of the present application, and the arrows in FIG. 2 indicate the running direction of each train. As shown in FIG. 2, a plurality of transponders 22 are provided on a railway track 21, which are transponder A, transponder B, and transponder C, respectively. When the front of the target train 23 passes through each transponder 22, the transponder 22 will send its own position information to the target train 23. Similarly, when the front of the target tracking train 24 passes through each transponder 22, the transponder 22 will send its own position information to the target tracking train 24. Exemplarily, the position information of each transponder 22 may be a mileage position of the transponder 22 on the entire railway line. For example, the mileage positions of the transponder A, the transponder B, and the transponder C on the railway line may be 24 km, 28 km, and 32 km, respectively.

In addition, the target train 23 is equipped with a speed sensor. When the front of the target train 23 passes through a transponder 22, the time point when the front of the target train 23 passes through the transponder 22 is used as a starting point of time, and the speed detected by the speed sensor is integrated. The integral result is equal to the distance traveled by the front of the train after passing through the transponder 22. For ease of understanding, by way of example, suppose that the front of the target train 23 passes through the transponder A at 10:45:12. Then take 10:45:12 as the starting point of time to start integrating the speed detected by the speed sensor. For example, when the time comes to 10:45:27, the speed between 10:45:12 and 10:45:27 has been integrated, so as to obtain the distance d1 between the front of the target train 23 and transponder A at 10:45:27. Then, the distance d1 can be added to the mileage position of the transponder A to obtain the mileage position D1 of the front of the target train 23 at 10:45:27.

In the same way, the distance d2 between the front of the target tracking train 24 and the transponder B at 10:45:27 can be obtained. Then, the distance d2 can be added to the mileage position of the transponder B to obtain the mileage position D2 of the front of the target tracking train 24 at 10:45:27.

The target tracking train 24 uses the mileage position D2 as the position information and sends it to the target train 23. After receiving D2, the target train 23 subtracts D1 from D2 to obtain a subtraction result X1. In some possible implementations, the execution subject may determine X1 as the distance between the target train and the target tracking train, which is actually the distance between the front of the target train and the front of the target tracking train.

Alternatively, in other possible implementations, the execution subject can also subtract the train length of the target tracking train from X1 to obtain a subtraction result X2. The execution subject can determine X2 as the distance between the target train and the target tracking train, which is actually the distance between the front of the target train and the rear of the target tracking train.

In some possible implementations, the running state data of the target train may also include a train speed and/or a train position. Here, the train speed can be collected by a sensor, and the train position can be the mileage position D1 of the front of the train described in the foregoing embodiments. After the execution subject obtains the running state data such as the train speed, the train position, and the distance, the execution subject may arrange and organize the running state data into a sequence according to a preset sorting method, which can be used as a running state vector.

As mentioned above, in some possible implementations, before the target train periodically obtains the running state data of the target train, it can be determined whether the target train enters the cruise state according to the traction force of the target train. Under a condition that the target train enters the cruising state, the target train starts to periodically obtain the running state data of the target train.

For a specific implementation, the target train can determine the running phase of the train by monitoring its traction force. Under a condition that the traction force of the target train is at a maximum traction force level, it means that the target train is currently in a starting phase. Under a condition that the traction force of the target train gradually decreases from the maximum traction force level to a minimum traction force level, it means that the target train is currently in a cruise phase, and the target train is in the cruise state at this time.

S120: determining a target control operation corresponding to the running state data from a plurality of preset control operations based on a preset reinforcement learning model, and controlling the target train according to the target control operation.

In the present application, each of the plurality of preset control operations is configured to control the speed of the target train. In some possible implementations, the plurality of preset control operations specifically correspond to a plurality of control gear positions arranged in an arithmetic sequence. The plurality of control gear positions include a control gear position for controlling acceleration of the target train, a control gear position for controlling deceleration of the target train, and a control gear position for controlling the target train to maintain a current speed.

Here, each gear position corresponds to a different traction or braking force, so the control gear positions arranged in an arithmetic sequence correspond to the traction or braking forces arranged in an arithmetic sequence. For ease of understanding, exemplarily, the plurality of preset control operations respectively correspond to: $-a$, $-a/2$, 0, $a/2$, and $a$. Here, a is a preset force or acceleration, and a is a positive number. $-a$ means braking with the magnitude of a, $-a/2$ means braking with the magnitude of $a/2$, $a/2$ means traction with the magnitude of $a/2$, and a means traction with the magnitude of a. Here, $-a$ and $-a/2$ are the control gear positions for controlling the deceleration of the target train, a and $a/2$ are the control gear positions for controlling the acceleration of the target train, and 0 is the control gear position for controlling the target train to maintain the current speed.

Here, the determining the target control operation corresponding to the running state data from the plurality of preset control operations based on the preset reinforcement learning model specifically includes: inputting the running state data into the reinforcement learning model to obtain a predicted value output by the reinforcement learning model for each preset control operation; and determining the target control operation from the plurality of preset control operations based on a greedy strategy algorithm according to respective predicted values of the plurality of preset control operations.

Figure 3:
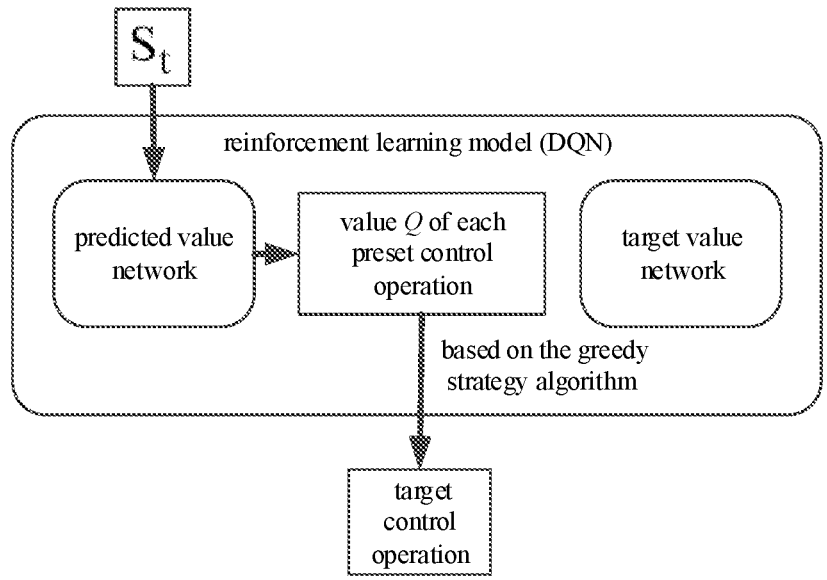
FIG. 3 is a schematic diagram for determining a target control operation according to an embodiment of the present application.

For a specific implementation, referring to FIG. 3, FIG. 3 is a schematic diagram for determining a target control operation according to an embodiment of the present application. As shown in FIG. 3, the reinforcement learning model uses a DQN (Deep Q-Networks) deep neural network model. The reinforcement learning model includes a predicted value network and a target value network, and the predicted value network and the target value network have a same network structure. The network parameters of the target value network are copied from the predicted value network. The predicted value network is configured to receive the running state vector s and output a predicted value Q corresponding to each preset control operation. The predicted value Q is used to represent the accumulation of the reward value.

In some possible implementations, in order to determine the target control operation, as shown in FIG. 3, the running state vector $s_t$ obtained in step S110 can be input into the predicted value network in the reinforcement learning model, so as to obtain a value Q output by the reinforcement learning model for each preset control operation. Then, the target control operation may be determined from the plurality of preset control operations based on the greedy strategy (c-greedy) algorithm according to respective values Q of the plurality of preset control operations.

S130: determining a reward value corresponding to a previous control operation of the target control operation according to the distance contained in the running state data.

In the present application, because that the execution of the previous control operation of the target control operation changes the distance between the target train and the target tracking train, the distance contained in the running state data can reflect the quality of the previous control operation. In this way, in the present application, the reward value corresponding to the previous control operation of the target control operation can be determined according to the distance contained in the running state data.

In the present application, in order to determine the reward value, it is also possible to determine the reward value corresponding to the previous control operation of the target control operation according to a previous distance contained in previous running state data of the running state data, the distance contained in the running state data, and a preset distance control interval.

Here, the previous distance contained in the previous running state data of the running state data is the distance contained in the previous running state data. In the present application, by comparing the distance contained in the running state data and the distance contained in the previous running state data, or by comparing the distance contained in the running state data, the distance contained in the previous running state data, and the preset distance control interval, the change trend of the distance can be reflected, and a relationship between the change trend and the distance control interval can be reflected. Therefore, the reward value corresponding to the previous control operation can be more reasonably determined.

To simplify the description, the distance in the running state data obtained currently is referred to as the current distance, and the previous distance in the previous running state data is referred to as the previous distance.

In some possible implementations, under a condition that the previous distance is within the distance control interval and the current distance is also within the distance control interval, it is determined that the reward value is equal to a first preset value. Under a condition that the previous distance is within the distance control interval and the current distance is outside the distance control interval, it is determined that the reward value is equal to a second preset value. The second preset value is less than the first preset value. Under a condition that the previous distance is outside the distance control interval, the current distance is also outside the distance control interval, and the current distance is closer to the distance control interval than the previous distance, it is determined that the reward value is equal to a third preset value. The third preset value is less than the first preset value and greater than the second preset value.

In the present application, determining the reward value according to the above implementation can facilitate the reinforcement learning model to be further optimized. Therefore, the Q value output by the reinforcement learning model for each preset control operation is more accurate. Thus, under a condition that the target control operation is selected according to the Q value and the target train is controlled according to the target control operation, the distance between the target train and the target tracking train may be kept within the distance control interval more stably.

Here, the first preset value may be a positive value, and the second preset value may be a negative value. For ease of understanding, exemplarily, the first preset value is set to 0.5, the second preset value is set to −10, the third preset value is set to 0, and the distance control interval is set to [198, 202] in meters.

Under a condition that the previous distance is equal to 199.5 meters and the current distance is equal to 200.4 meters, then since the previous distance is within the distance control interval and the current distance is also within the distance control interval, it is determined that the reward value is equal to 0.5.

Under a condition that the previous distance is equal to 199.5 meters and the current distance is equal to 202.8 meters, then since the previous distance is within the distance control interval and the current distance is outside the distance control interval, it is determined that the reward value is equal to −10.

Under a condition that the previous distance is equal to 199.5 meters and the current distance is equal to 196.6 meters, then since the previous distance is within the distance control interval and the current distance is outside the distance control interval, it is determined that the reward value is equal to −10.

Under a condition that the previous distance is equal to 197.1 meters and the current distance is equal to 197.5 meters, then since the previous distance is outside the distance control interval, the current distance is also outside the distance control interval, and the current distance is closer to the distance control interval than the previous distance, it is determined that the reward value is equal to 0.

In some possible implementations, under a condition that the previous distance is within the distance control interval, the current distance is also within the distance control interval, and the current distance is closer to a preset target distance than the previous distance, the reward value is determined according to a difference between the current distance and the preset target distance. Here, the preset target distance is a value within the distance control interval, and the smaller the difference between the current distance and the preset target distance, the larger the reward value.

In the present application, determining the reward value according to the above implementation can optimize the distance error. Therefore, the reinforcement learning model can obtain sufficient positive feedbacks to perform optimization learning.

Here, the preset target distance can be set to the midpoint of the distance control interval. For example, under a condition that the distance control interval is [198, 202], the preset target distance is set to 200 meters.

Exemplarily, under a condition that the previous distance is within the distance control interval, the current distance is also within the distance control interval, and the current distance is closer to the preset target distance than the previous distance, the reward value can be calculated according to the following formula: r=c−|dr−de|, where r is the reward value, dr is the current distance, de is the preset target distance, | | is the absolute value symbol, and c is a preset positive number, for example, c can be set to a positive number 5.

S140: updating the reinforcement learning model according to the reward value.

In the present application, a loss value can be further determined based on the reward value determined in step S130, and the reinforcement learning model can be updated with the loss value, so that the reinforcement learning model can be optimized by online learning during the running of the train. Therefore, during the subsequent control of the target train, the reinforcement learning model may help to stably keep the distance between the target train and the target tracking train within the distance control interval.

According to the method for tracking and controlling virtual marshalling trains provided in the embodiments of the present application, the running state data of the target train is obtained, the target control operation corresponding to the running state data is determined from the plurality of preset control operations based on the preset reinforcement learning model, and the control of the target train is implemented according to the target control operation. In the present application, since the running state data includes the distance between the target train and the target tracking train, the target control operation will be determined by taking the distance as a consideration factor, such that a suitable target control operation may be determined. By performing the target control operation, the distance between the target train and the target tracking train may be adjusted. According to the method for tracking and controlling virtual marshalling trains provided in the embodiments of the present application, the distance between the trains in the virtual marshalling will not be too large or too small, thereby achieving the purpose of taking into account the running safety and improving the utilization of the railway resources.

In addition, in the present application, the reward value corresponding to the previous control operation of the target control operation is determined according to the distance contained in the running state data, and the reinforcement learning model is updated according to the reward value. In this way, the reinforcement learning model can be continuously optimized during the running of the train, thereby helping to improve the stability of the control of the train.

Figure 4:
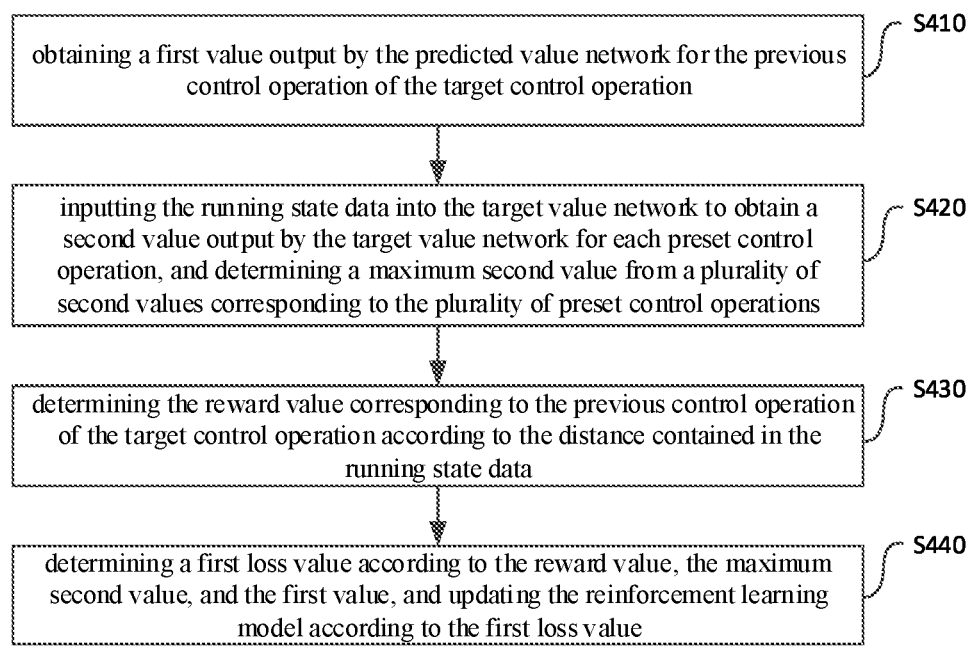
FIG. 4 is a schematic flowchart for online updating a reinforcement learning model according to an embodiment of the present application.

Referring to FIG. 4, FIG. 4 is a schematic flowchart for online updating a reinforcement learning model according to an embodiment of the present application. Here, the reinforcement learning model includes a predicted value network and a target value network, and the predicted value network and the target value network have a same network structure. As shown in FIG. 4, the online update solution includes the following steps S410 to S440.

S410: obtaining a first value output by the predicted value network for the previous control operation of the target control operation. In the present application, in order to simplify the description, the value output by the predicted value network is referred to as the first value.

S420: inputting the running state data into the target value network to obtain a second value output by the target value network for each preset control operation, and determining a maximum second value from a plurality of second values corresponding to the plurality of preset control operations. In the present application, in order to simplify the description, the value output by the target value network is referred to as the second value.

S430: determining the reward value corresponding to the previous control operation of the target control operation according to the distance contained in the running state data.

S440: determining a first loss value according to the reward value, the maximum second value, and the first value, and updating the reinforcement learning model according to the first loss value.

In the present application, during the running of the target train, the previous running state data $s_{t-1}$, the previous control operation $a_{t-1}$, the reward value $r_{t-1}$ determined for the previous control operation based on the distance in the current running state data, and the current running state data $s_t$ can be used as a set of training data. Therefore, the reinforcement learning model may be updated and optimized online in the manner shown in FIG. 4.

It should be noted that during the running of the target train, the running state data is periodically obtained. Therefore, the target control operation is periodically determined, and the reinforcement learning model is periodically updated online. Thus, in a previous period, the execution subject performs the following steps S010 to S040.

S010: obtaining the running state data of the previous period, that is $s_{t-1}$.

S020: inputting $s_{t-1}$ into the predicted value network of the reinforcement learning model, so as to output the first value by the predicted value network for each preset control operation; determining the target control operation of the previous period from the plurality of preset control operations based on the greedy strategy algorithm according to respective first values corresponding to the plurality of preset control operations, that is $a_{t-1}$; and controlling the target train according to $a_{t-1}$.

S030: determining the reward value corresponding to $a_{t-2}$ according to the distance contained in $s_{t-1}$, wherein $a_{t-2}$ refers to the previous control operation of $a_{t-1}$.

S040: updating the reinforcement learning model according to the reward value corresponding to $a_{t-2}$.

It can be seen that in the previous period, the execution subject has obtained the plurality of first values output by the predicted value network for the plurality of preset control operations by inputting $s_{t-1}$ into the predicted value network of the reinforcement learning model, wherein the plurality of first values includes the first value corresponding to $a_{t-1}$. Therefore, in the current period, in order to continue to update the reinforcement learning model online, when step S410 is performed, the first value corresponding to $a_{t-1}$ can be directly obtained from the plurality of first values obtained in the previous period.

It should also be noted that steps S110, S120, S410, S420, S430, and S440 are steps that the execution subject needs to perform in the current period. Here, steps S410 to S440 are used to update the reinforcement learning model online, and steps S410 to S440 can be executed after step S110 or after step S120, which is not limited in the present application. As for the three steps S410, S420, and S430, the present application does not limit their mutual execution order.

Figure 5:
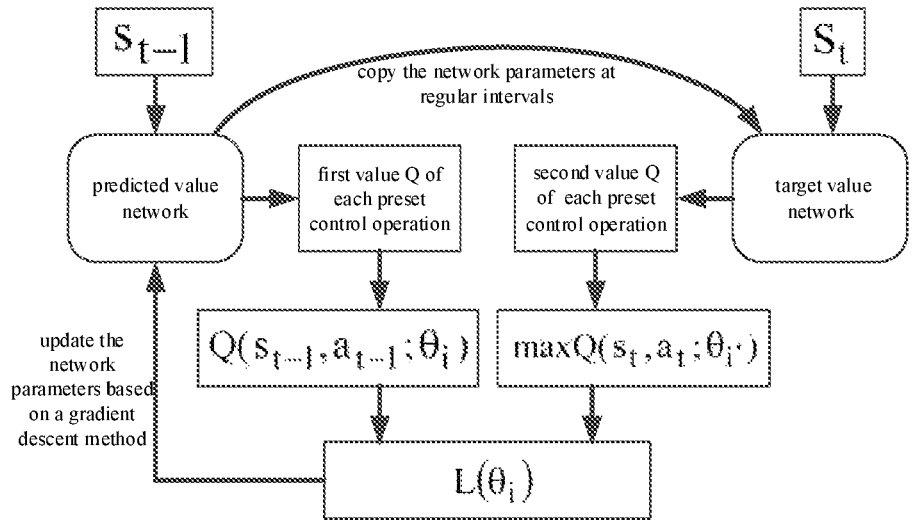
FIG. 5 is a schematic diagram for updating a reinforcement learning model according to an embodiment of the present application.

Referring to FIG. 5, FIG. 5 is a schematic diagram for updating a reinforcement learning model according to an embodiment of the present application. As shown in FIG. 5, when the reinforcement learning model is updated and optimized online, the first value output by the predicted value network for the previous control operation can be obtained. Specifically, the previous running state data $s_{t-1}$ is input into the predicted value network to obtain the first value output by the predicted value network for each preset control operation, and then the first value $Q(s_{t-1}, a_{t-1}; \theta_i)$ of the previous control operation $a_{t-1}$ is obtained therefrom, where $\theta_i$ represents the network parameters of the predicted value network.

As shown in FIG. 5, the current running state data $s_t$ is input into the target value network to obtain the second value output by the target value network for each preset control operation, and then the maximum second value $\max Q(s_t, a_t; \theta_{i'})$ is determined from the plurality of second values, where $\theta_{i'}$ represents the network parameters of the target value network.

As shown in FIG. 5, the target value y is calculated according to the reward value and the maximum second value $\max Q(s_t, a_t; \theta_{i'})$. The specific calculation formula is as follows:

$$y = r_{t-1} + \gamma \max Q(s_t a_t; \theta_{i'})$$

Where $\gamma$ is a preset discount factor, $\gamma$ is a decimal between 0 and 1. $r_{t-1}$ represents the reward value corresponding to the previous control operation, and $r_{t-1}$ is the reward value determined in step S430. For the specific implementation of step S430, please refer to step S130.

As shown in FIG. 5, the loss value $L(\theta_i)$ used to update the predicted value network is calculated according to the target value y and the first value $Q(s_{t-1}, a_t; \theta_i)$. The specific calculation formula is as follows, where E represents a mean square error:

$$L(\theta_i) = E[r(t_{-1} + \gamma \max Q(s_t a_t; \theta_{i'}) - Q(s_{t-1}, a_{t-1}; \theta_i))^2].$$

As shown in FIG. 5, after calculating the loss value $L(\theta_i)$, the network parameters $\theta_i$ of the predicted value network are updated based on a gradient descent method. In addition, in the present application, the newly trained network parameters of the predicted value network can be copied to the target value network at regular intervals (for example, every 10 periods).

Figure 6:
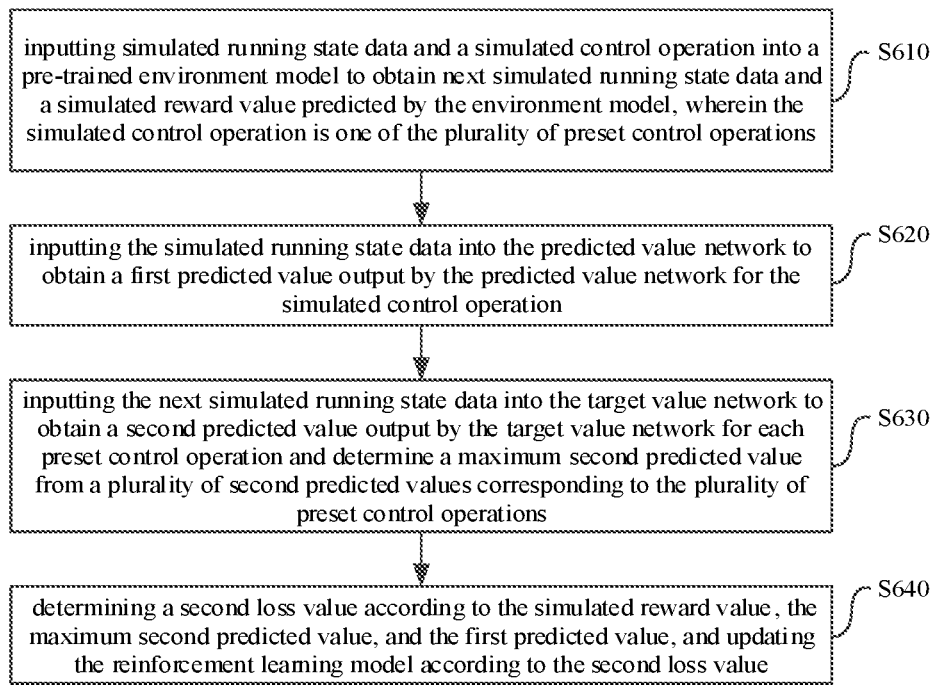
FIG. 6 is a flowchart for offline training a reinforcement learning model according to an embodiment of the present application.

Referring to FIG. 6, FIG. 6 is a flowchart for offline training a reinforcement learning model according to an embodiment of the present application. Here, the offline training refers to the training of the reinforcement learning model in a simulated railway running environment, in other words, the training of the reinforcement learning model in a non-real railway running environment. In the present application, after the reinforcement learning model completes the offline training, the reinforcement learning model is transplanted to the target train. During the trial running or running of the target train, the reinforcement learning model is used to control the running of the train according to the methods of S110 and S120. Further, the reinforcement learning model is updated and optimized online according to the methods of S130 and S140 or according to the methods of S410-S440.

As shown in FIG. 6, before the reinforcement learning model is deployed to the target train, its offline training process includes the following steps S610 to S640.

S610: inputting simulated running state data and a simulated control operation into a pre-trained environment model to obtain next simulated running state data and a simulated reward value predicted by the environment model, wherein the simulated control operation is one of the plurality of preset control operations.

S620: inputting the simulated running state data into the predicted value network to obtain a first predicted value output by the predicted value network for the simulated control operation.

S630: inputting the next simulated running state data into the target value network to obtain a second predicted value output by the target value network for each preset control operation and determine a maximum second predicted value from a plurality of second predicted values corresponding to the plurality of preset control operations.

S640: determining a second loss value according to the simulated reward value, the maximum second predicted value, and the first predicted value, and updating the reinforcement learning model according to the second loss value.

Figure 7:
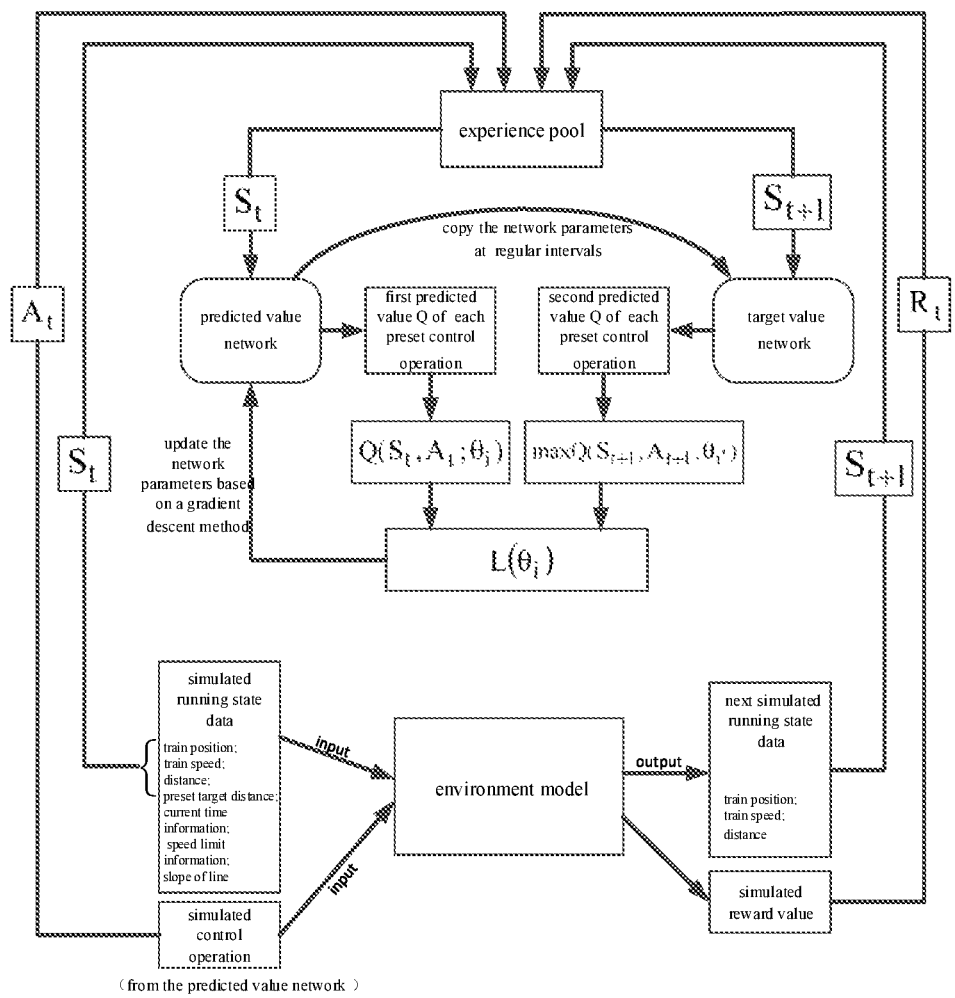
FIG. 7 is a schematic diagram for offline training corresponding to the flowchart for offline training shown in FIG. 6.

For a specific implementation, referring to FIG. 7, FIG. 7 is a schematic diagram for offline training corresponding to the flowchart for offline training shown in FIG. 6. As shown in FIG. 7, the simulated running state data can include: a train position, a train speed, a distance from the target tracking train, a preset target distance (i.e., a desired tracking distance), current time information, speed limit information of the line, and a slope of the line.

For a specific implementation, in order to obtain the simulated running state data, the running state data such as the train position, the train speed, the distance, the preset target distance, the current time information, the speed limit information of the line, and the slope of the line can be randomly generated. Then, these randomly generated running state data are sorted according to a preset sorting method, and finally the sorting result is used as the simulated running state data.

In order to obtain the simulated control operation, the randomly generated running state data such as the train position, the train speed, and the distance can be input into the predicted value network of the reinforcement learning model to obtain the first value output by the predicted value network for each preset control operation. Then, the simulated control operation may be determined from the plurality of preset control operations based on the greedy strategy algorithm according to respective first values corresponding to the plurality of preset control operations.

When performing step S610, as shown in FIG. 7, the simulated running state data and the simulated control operation are input into the environment model, and the next simulated running state data and the simulated reward value output by the environment model can be obtained. The next simulated running state data may include running state data such as the train position, the train speed, and the distance.

As shown in FIG. 7, the train position, the train speed, and the distance in the simulated running state data can be taken as the sample state $S_t$. The simulated control operation can be taken as the sample action $A_t$. The simulated reward value output by the environment model can be taken as the sample reward value $R_t$. The next simulated running state data output by the environment model can be taken as the sample state $S_{t+1}$. Therefore, a sample group $(S_t, A_t, R_t, S_{t+1})$ is obtained, and then the sample group can be stored in the experience pool by means of experience playback.

When performing steps S620 to S640, as shown in FIG. 7, the sample group $(S_t, A_t, R_t, S_{t+1})$ can be obtained from the experience pool. Then, the simulated running state data $S_t$ in the sample group is input into the predicted value network in the reinforcement learning model to obtain the first predicted value Q output by the predicted value network for each preset control operation. The plurality of first predicted values Q include the first predicted value $Q(S_t, A_t; \theta_i)$ corresponding to the simulated control operation $A_t$.

As shown in FIG. 7, the next simulated running state data in the sample group is input into the target value network in the reinforcement learning model, so as to obtain the second predicted value Q output by the target value network for each preset control operation. Then, the maximum second predicted value $\max Q(S_{t+1}, A_{t+1}; \theta_{i'})$ is determined from the plurality of second predicted values Q of the plurality of preset control operations. Then, the target value Y is calculated according to the maximum second predicted value and the simulated reward value $R_t$ in the sample group. The specific calculation formula is as follows:

$$Y=R_t+\gamma \max Q(S_{t+1}, A_{t+1}; \theta_{i'})$$

Where γ is a preset discount factor, and γ is a decimal between 0 and 1.

As shown in FIG. 7, the loss value $L(\theta_i)$ used to update the predicted value network is calculated according to the target value Y and the first predicted value $Q(S_t, A_t; \theta_i)$. The specific calculation formula is as follows, where E represents a mean square error:

$$L(\theta_i)=E[R_t+\gamma \max Q(S_{t+1}, A_{t+1}; \theta_{i'})-Q(S_t, A_t; \theta_i))^2].$$

As shown in FIG. 7, after calculating the loss value $L(\theta_i)$, the network parameters $\theta_i$ of the predicted value network are updated based on a gradient descent method. In addition, in the present application, the newly trained network parameters of the predicted value network can be copied to the target value network at regular intervals (for example, every 10 periods).

In some possible implementations, the network structure of the environment model may be Sparsity Invariant CNNs (SCNN), and the environment model can be trained as follows.

In a first step, a time sequence of the running state of the train is constructed based on the historical running data of the train. The time sequence includes a plurality of samples consecutive in time. The plurality of samples can be expressed as: $\{X_1^1, X_1^2 \ldots X_1^n\}, \{X_2^1, X_2^2 \ldots X_2^n\} \ldots \{X_t^1, X_t^2 \ldots X_t^n\}, \{X_{t+1}^1, X_{t+1}^2 \ldots X_{t+1}^n\}$, where $\{X_t^1, X_t^2 \ldots X_t^n\}$ represent the following data collected at time t: a train position, a train speed, a distance from the preceding train, a preset target distance (i.e., a desired tracking distance), current time information, speed limit information of the line, a slope of the line, and control operations. In addition, each sample also carries a sample reward value, and the sample reward value of each sample is determined according to the distance in the next sample. For the specific determination method, please refer to step S130.

In a second step, for each sample, the sample will be input into the environment model to obtain the next running state and the reward value predicted by the environment model. The next running state includes the train position at the next moment, the train speed at the next moment, and the distance at the next moment. Then, the predicted reward value is compared with the sample reward value carried by the sample to determine the reward value loss. Then, the next running state is compared with the sample at the next moment to determine the state loss value. Finally, the total loss value is determined according to the reward value loss and the state loss, and the network parameters of the environment model are updated according to the total loss value.

In order to facilitate the understanding of the second step above, for example, $\{X_t^1, X_t^2 \ldots X_t^n\}$ are input into the environment model to obtain the train position at the next moment, the train speed at the next moment, the distance at the next moment, and the reward value $R_p$ predicted by the environment model. Then, a difference between the reward value R and the sample reward value carried in $\{X_t^1, X_t^2 \ldots X_t^n\}$ is calculated, and the difference is normalized to obtain the reward value loss.

Then, the train position at the next moment, the train speed at the next moment, the distance at the next moment are arranged into a sequence, and the sequence is used as the first vector. The train position, the train speed and the distance are read from $\{X_{t+1}^1, X_{t+1}^2 \ldots X_{t+1}^n\}$. Then, the train position, the train speed and the distance are arranged into a sequence, and the sequence is used as the second vector. Finally, the vector distance between the first vector and the second vector is calculated, and the vector distance is normalized to obtain the state loss.

Finally, the total loss value is calculated according to the reward value loss, the state loss and their respective weights. Then, the network parameters of the environment model are updated according to the total loss value using the stochastic gradient descent method combined with the batch gradient descent method.

In summary, the present application provides a method for tracking and controlling virtual marshalling trains. Firstly, in a non-real railway running environment, a plurality of sample groups $(S_t, A_t, R_t, S_{t+1})$ are generated by a pre-trained environment model and a reinforcement learning model to be trained, and the plurality of sample groups are stored in the experience pool. Then, a sample group is randomly obtained from the experience pool, and the obtained sample group is used to train the reinforcement learning model. After the training of the reinforcement learning model is completed, the reinforcement learning model is transplanted to the target train.

Under a condition that the target train forms a virtual marshalling with other trains and the virtual marshalling runs between the platforms, the running state data of the target train is obtained, the target control operation corresponding to the running state data is determined from the plurality of preset control operations based on the reinforcement learning model deployed on the target train, and the control of the target train is implemented according to the target control operation. Therefore, the distance between the target train and the target tracking train may be adjusted. In addition, the reward value corresponding to the previous control operation of the target control operation is determined according to the distance contained in the running state data, and then the reinforcement learning model is updated and optimized online according to the reward value.

Figure 8:
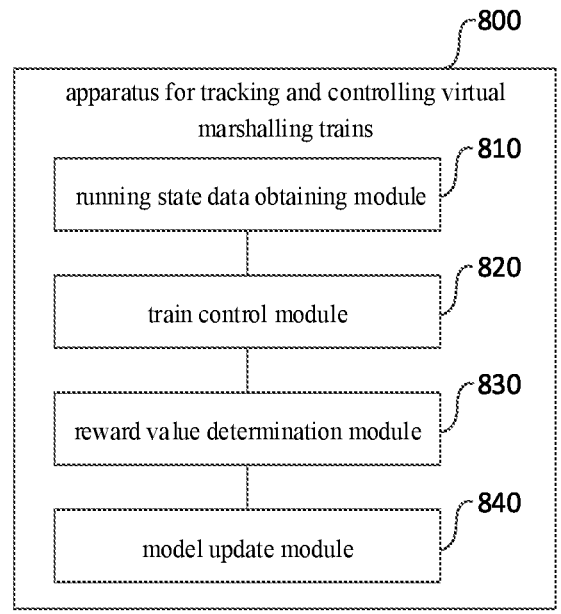
FIG. 8 is a schematic diagram of an apparatus 800 for tracking and controlling virtual marshalling trains according to an embodiment of the present application.

Referring to FIG. 8, FIG. 8 is a schematic diagram of an apparatus 800 for tracking and controlling virtual marshalling trains according to an embodiment of the present application. As shown in FIG. 8, the apparatus 800 for tracking and controlling virtual marshalling trains includes:

a running state data obtaining module 810 configured to obtain running state data of a target train, wherein the running state data comprises a distance between the target train and a target tracking train, the target train and the target tracking train are located in a same virtual marshalling, and in the virtual marshalling, the target tracking train is a train running in front of the target train and closest to the target train;

a train control module 820 configured to determine a target control operation corresponding to the running state data from a plurality of preset control operations based on a preset reinforcement learning model, and control the target train according to the target control operation;

a reward value determination module 830 configured to determine a reward value corresponding to a previous control operation of the target control operation according to the distance contained in the running state data; and a model update module 840 configured to update the reinforcement learning model according to the reward value.

In some possible implementations, the reward value determination module 830 is specifically configured to determine the reward value corresponding to the previous control operation of the target control operation according to a previous distance contained in previous running state data of the running state data, the distance contained in the running state data, and a preset distance control interval.

In some possible implementations, the reward value determination module 830 is specifically configured to: determine, under a condition that the previous distance is within the distance control interval and the current distance (i.e., the distance contained in the running state data) is also within the distance control interval, that the reward value is equal to a first preset value; determine, under a condition that the previous distance is within the distance control interval and the current distance is outside the distance control interval, that the reward value is equal to a second preset value, wherein the second preset value is less than the first preset value; and determine, under a condition that the previous distance is outside the distance control interval, the current distance is also outside the distance control interval, and the current distance is closer to the distance control interval than the previous distance, that the reward value is equal to a third preset value, wherein the third preset value is less than the first preset value and greater than the second preset value.

In some possible implementations, the reward value determination module 830 is specifically configured to: determine, under a condition that the previous distance is within the distance control interval, the current distance is also within the distance control interval, and the current distance is closer to a preset target distance than the previous distance, the reward value according to a difference between the current distance and the preset target distance; wherein the preset target distance is a value within the distance control interval, and the smaller the difference between the current distance and the preset target distance, the larger the reward value.

In some possible implementations, the plurality of preset control operations correspond to a plurality of control gear positions arranged in an arithmetic sequence, and the plurality of control gear positions include a control gear position for controlling acceleration of the target train, a control gear position for controlling deceleration of the target train, and a control gear position for controlling the target train to maintain a current speed.

In some possible implementations, the reinforcement learning model includes a predicted value network and a target value network, and the predicted value network and the target value network have a same network structure. The model update module 840 is specifically configured to: obtain a first value output by the predicted value network for the previous control operation of the target control operation; input the running state data into the target value network to obtain a second value output by the target value network for each preset control operation, and determine a maximum second value from a plurality of second values corresponding to the plurality of preset control operations; and determine a first loss value according to the reward value, the maximum second value, and the first value, and update the reinforcement learning model according to the first loss value.

In some possible implementations, the reinforcement learning model is trained in the following manner before being deployed to the target train: inputting simulated running state data and a simulated control operation into a pre-trained environment model to obtain next simulated running state data and a simulated reward value predicted by the environment model, wherein the simulated control operation is one of the plurality of preset control operations; inputting the simulated running state data into the predicted value network to obtain a first predicted value output by the predicted value network for the simulated control operation; inputting the next simulated running state data into the target value network to obtain a second predicted value output by the target value network for each preset control operation and determine a maximum second predicted value from a plurality of second predicted values corresponding to the plurality of preset control operations; and determining a second loss value according to the simulated reward value, the maximum second predicted value, and the first predicted value, and updating the reinforcement learning model according to the second loss value.

It should be noted that those skilled in the art can clearly understand that, for the convenience and conciseness of description, the specific working process of the apparatus described above can refer to the corresponding process in the foregoing method embodiment, which will not be repeated here.

Figure 9:
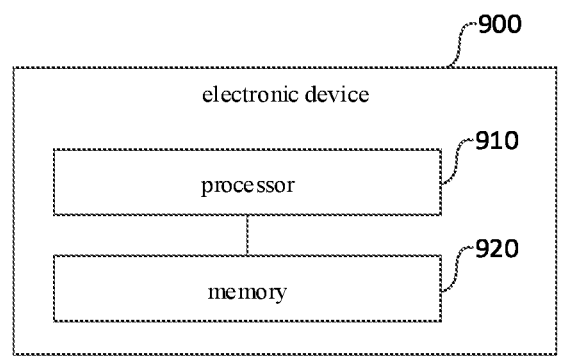
FIG. 9 is a structural block diagram of an electronic device according to an embodiment of the present application.

Referring to FIG. 9, FIG. 9 is a structural block diagram of an electronic device according to an embodiment of the present application. The electronic device 900 includes a processor 910, a memory 920, and one or more application programs, wherein the one or more application programs are stored in the memory 920 and are configured to be executed by one or more processors 910. The one or more application programs are configured to perform the aforementioned method for tracking and controlling virtual marshalling trains.

The electronic device 900 in the present application may include one or more of the following components: a processor 910, a memory 920, and one or more application programs, wherein the one or more application programs may be stored in the memory 920 and may be configured to be executed by one or more processors 910. The one or more application programs are configured to perform the method described in the foregoing method embodiment.

The processor 910 may include one or more processing cores. The processor 910 uses various interfaces and lines to connect various parts of the entire electronic device 900, and performs various functions of the electronic device 900 and processes data by running or executing instructions, programs, code sets, or instruction sets stored in the memory 920 and calling data stored in the memory 920. Optionally, the processor 910 may be implemented in at least one hardware form of Digital Signal Processing (DSP), Field-Programmable Gate Array (FPGA), and Programmable Logic Array (PLA). The processor 910 may be integrated with one or a combination of a Central Processing Unit (CPU), a Graphics Processing Unit (GPU), and a modem. Here, the CPU mainly processes the operating system, the user interface and the application programs; the GPU is configured to render and draw display content; and the modem is configured to process wireless communication. It can be understood that the above modem may not be integrated into the processor 910, but may be implemented by a communication chip alone.

The memory 920 may include a Random Access Memory (RAM) or a Read-Only Memory (ROM). The memory 920 may be configured to store instructions, programs, codes, code sets or instruction sets. The memory 920 may include a storage program region and a storage data region, where the storage program region may store instructions for implementing an operating system, instructions for implementing at least one function (such as touch function, sound playback function, image playback function), and instructions for implementing the foregoing method embodiments. The data storage region may also store data created by the electronic device 900 in use.

Those skilled in the art should understand that the embodiments of the application can be provided as methods, systems, or computer program products. Therefore, the application may adopt a form of a complete hardware embodiment, a complete software embodiment, or an embodiment combining software and hardware. Moreover, the application may adopt a form of a computer program product implemented on one or more computer-usable storage media (including but not limited to disk storage, CD-ROM, optical storage, etc.) containing computer-usable program codes.

The application is described with reference to flowcharts and/or block diagrams of methods, devices (systems), and computer program products according to embodiments of the application. It should be understood that each process and/or block in the flowcharts and/or block diagrams, and combinations of processes and/or blocks in the flowcharts and/or block diagrams can be realized by computer program instructions. These computer program instructions can be provided to a processor of a general-purpose computer, a special-purpose computer, an embedded processor, or other programmable data processing equipment to generate a machine, so that the instructions executed by the processor of the computer or other programmable data processing equipment generate means for implementing functions specified in one or more processes in the flowcharts and/or one or more blocks in the block diagrams.

These computer program instructions can also be stored in a computer-readable memory that can direct a computer or other programmable data processing equipment to work in a specific manner, so that the instructions stored in the computer-readable memory generate a manufacture article including instruction means. The instruction means can implement functions specified in one or more processes in the flowcharts and/or one or more blocks in the block diagrams.

These computer program instructions can also be loaded on a computer or other programmable data processing equipment, enabling a series of operation steps to be executed on the computer or other programmable equipment to generate computer-implemented processing, so that the instructions executed on the computer or other programmable equipment can provide steps to implement functions specified in one or more processes in the flowcharts and/or one or more blocks in the block diagrams.

Although preferred embodiments of the application have been described, those skilled in the art can make additional changes and modifications to these embodiments once they learn the basic inventive concept. Therefore, the appended claims are intended to be interpreted as including the preferred embodiments and all changes and modifications falling within the scope of the application.

Obviously, those skilled in the art can make various modifications and modifications to the application without departing from the spirit and scope of the application. As such, if these modifications and variations of the application fall within the scope of the claims of the application and their equivalent technologies, these modifications and variations are intended to be included in the application.

What is claimed is:

1. A method for tracking and controlling virtual marshalling trains, wherein the method comprises:

obtaining running state data of a target train, wherein the running state data comprises a distance between the target train and a target tracking train, the target train and the target tracking train are located in a same virtual marshalling, and in the virtual marshalling, the target tracking train is a train running in front of the target train and closest to the target train;

determining a target control operation corresponding to the running state data from a plurality of preset control operations based on a preset reinforcement learning model, and controlling the target train according to the target control operation;

determining a reward value corresponding to a previous control operation of the target control operation according to the distance contained in the running state data; and updating the reinforcement learning model according to the reward value.

2. The method according to claim 1, wherein the determining the reward value corresponding to the previous control operation of the target control operation according to the distance contained in the running state data comprises:

determining the reward value corresponding to the previous control operation of the target control operation according to a previous distance contained in previous running state data of the running state data, the distance contained in the running state data, and a preset distance control interval.

3. The method according to claim 2, wherein the determining the reward value corresponding to the previous control operation of the target control operation according to the previous distance contained in the previous running state data of the running state data, the distance contained in the running state data, and the preset distance control interval comprises:

determining, under a condition that the previous distance is within the distance control interval and the distance is also within the distance control interval, that the reward value is equal to a first preset value;

determining, under a condition that the previous distance is within the distance control interval and the distance is outside the distance control interval, that the reward value is equal to a second preset value, wherein the second preset value is less than the first preset value; and determining, under a condition that the previous distance is outside the distance control interval, the distance is also outside the distance control interval, and the distance is closer to the distance control interval than the previous distance, that the reward value is equal to a third preset value, wherein the third preset value is less than the first preset value and greater than the second preset value.

4. The method according to claim 2, wherein the determining the reward value corresponding to the previous control operation of the target control operation according to the previous distance contained in the previous running state data of the running state data, the distance contained in the running state data, and the preset distance control interval comprises:

determining, under a condition that the previous distance is within the distance control interval, the distance is also within the distance control interval, and the distance is closer to a preset target distance than the previous distance, the reward value according to a difference between the distance and the preset target distance;

wherein the preset target distance is a value within the distance control interval, and the smaller the difference between the distance and the preset target distance, the larger the reward value.

5. The method according to claim 1, wherein the determining the target control operation corresponding to the running state data from the plurality of preset control operations based on the preset reinforcement learning model comprises:

inputting the running state data into the reinforcement learning model to obtain a predicted value output by the reinforcement learning model for each preset control operation;

determining the target control operation from the plurality of preset control operations based on a greedy strategy algorithm according to respective predicted values of the plurality of preset control operations;

wherein the plurality of preset control operations correspond to a plurality of control gear positions arranged in an arithmetic sequence, and the plurality of control gear positions comprise a control gear position for controlling acceleration of the target train, a control gear position for controlling deceleration of the target train, and a control gear position for controlling the target train to maintain a current speed.

6. The method according to claim 1, wherein the reinforcement learning model comprises a predicted value network and a target value network, and the predicted value network and the target value network have a same network structure; and before updating the reinforcement learning model according to the reward value, the method further comprises:

obtaining a first value output by the predicted value network for the previous control operation of the target control operation;

inputting the running state data into the target value network to obtain a second value output by the target value network for each preset control operation, and determining a maximum second value from a plurality of second values corresponding to the plurality of preset control operations; and the updating the reinforcement learning model according to the reward value comprises:

determining a first loss value according to the reward value, the maximum second value, and the first value, and updating the reinforcement learning model according to the first loss value.

7. The method according to claim 6, wherein the reinforcement learning model is trained in the following manner before being deployed to the target train:

inputting simulated running state data and a simulated control operation into a pre-trained environment model to obtain next simulated running state data and a simulated reward value predicted by the environment model, wherein the simulated control operation is one of the plurality of preset control operations;

inputting the simulated running state data into the predicted value network to obtain a first predicted value output by the predicted value network for the simulated control operation;

inputting the next simulated running state data into the target value network to obtain a second predicted value output by the target value network for each preset control operation and determine a maximum second predicted value from a plurality of second predicted values corresponding to the plurality of preset control operations; and determining a second loss value according to the simulated reward value, the maximum second predicted value, and the first predicted value, and updating the reinforcement learning model according to the second loss value.

8. The method according to claim 1, wherein before the obtaining the running state data of the target train, the method further comprises:

determining whether the target train enters a cruise state according to a traction force of the target train; and the obtaining the running state data of the target train comprises:

obtaining, under a condition that the target train enters the cruise state, the running state data of the target train.

9. An apparatus for tracking and controlling virtual marshalling trains, wherein the apparatus comprises:

a running state data obtaining module configured to obtain running state data of a target train, wherein the running state data comprises a distance between the target train and a target tracking train, the target train and the target tracking train are located in a same virtual marshalling, and in the virtual marshalling, the target tracking train is a train running in front of the target train and closest to the target train;

a train control module configured to determine a target control operation corresponding to the running state data from a plurality of preset control operations based on a preset reinforcement learning model, and control the target train according to the target control operation;

a reward value determination module configured to determine a reward value corresponding to a previous control operation of the target control operation according to the distance contained in the running state data; and a model update module configured to update the reinforcement learning model according to the reward value.

10. An electronic device, comprising a processor, a memory, and a bus, wherein the memory stores machine-readable instructions executable by the processor, the processor communicates with the memory through the bus when the electronic device is operating, and the machine-readable instructions, when executed by the processor, perform the method according to claim 1.

11. A storage medium having computer programs stored thereon, wherein the computer programs, when executed by a processor, perform the method according to claim 1.

* * * * *